(12) United States Patent
Lee et al.

(10) Patent No.: US 12,397,264 B2
(45) Date of Patent: Aug. 26, 2025

(54) GRAVITY TYPE WATER-PURIFYING DEVICE

(71) Applicant: AMOGREENTECH CO., LTD., Gimpo-si (KR)

(72) Inventors: Sung Bin Lee, Gimpo-si (KR); Kyoung Ku Han, Gimpo-si (KR); Jae Kyung Song, Gimpo-si (KR); Jin Lee, Gimpo-si (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 304 days.

(21) Appl. No.: 18/258,614

(22) PCT Filed: Dec. 17, 2021

(86) PCT No.: PCT/KR2021/019272
§ 371 (c)(1),
(2) Date: Jun. 21, 2023

(87) PCT Pub. No.: WO2022/139344
PCT Pub. Date: Jun. 30, 2022

(65) Prior Publication Data
US 2024/0066450 A1 Feb. 29, 2024

(30) Foreign Application Priority Data
Dec. 24, 2020 (KR) ........................ 10-2020-0183243

(51) Int. Cl.
*B01D 63/08* (2006.01)
*B01D 35/30* (2006.01)
*B01D 45/02* (2006.01)

(52) U.S. Cl.
CPC ........... *B01D 63/08* (2013.01); *B01D 35/303* (2013.01); *B01D 45/02* (2013.01); *B01D 63/082* (2013.01); *B01D 2201/0415* (2013.01)

(58) Field of Classification Search
None
See application file for complete search history.

(56) References Cited

U.S. PATENT DOCUMENTS

| 419,023 | A | * | 1/1890 | Roberts | ................ | B01D 24/183 |
| | | | | | | 210/313 |
| 445,223 | A | * | 1/1891 | Knight | ................. | B01D 37/025 |
| | | | | | | 55/501 |

(Continued)

FOREIGN PATENT DOCUMENTS

| KR | 200295215 Y1 | 11/2002 |
| KR | 20040042180 A | 5/2004 |

(Continued)

OTHER PUBLICATIONS

International Search Report issued in PCT/KR2021/019272 dated Mar. 24, 2022, 5 pgs.

*Primary Examiner* — Robert J Popovics
(74) *Attorney, Agent, or Firm* — Rothwell, Figg, Ernst & Manbeck, P.C.

(57) ABSTRACT

A gravity type water-purifying device is provided. A gravity type water-purifying device according to an embodiment of the present invention comprises: a filtered water generating part comprising a filler module for filtering out foreign materials contained in raw water by using gravity, a housing which stores a predetermined amount of the raw water and has a filtering space formed therein in which the filter module is disposed, and an outlet formed through the housing to allow the filtered water generated through the filter module to be discharged to the outside; and a filtered water storing part which has a filtered water storing space formed therein in order to store a predetermined amount of filtered water generated by the filtered water generating part, is detachably connected to the filtered water generating part by unit of a connection pipe so as to be separable from the (Continued)

filtered water generating part and be movable by itself, and is provided with an opening/closing unit for discharging filtered water stored in the filtered water storing space to the outside.

13 Claims, 13 Drawing Sheets

(56) References Cited

U.S. PATENT DOCUMENTS

| | | | | |
|---|---|---|---|---|
| 513,802 | A * | 1/1894 | Luscombe | C02F 1/001 210/476 |
| 541,970 | A * | 7/1895 | Harder | C02F 1/001 210/314 |
| 546,335 | A * | 9/1895 | Knight | B01D 27/02 210/458 |
| 548,487 | A * | 10/1895 | Way | A61M 1/3633 210/411 |
| 569,382 | A * | 10/1896 | Knight | B01D 39/1623 210/123 |
| 589,887 | A * | 9/1897 | Ziegler | F25D 3/04 210/486 |
| 630,846 | A * | 8/1899 | Bliss | B01D 29/33 210/462 |
| 645,500 | A * | 3/1900 | Ziegler | B01D 25/26 210/473 |
| 676,755 | A * | 6/1901 | Melcher | C02F 1/003 210/473 |
| 963,324 | A * | 7/1910 | Randall | B01D 21/26 210/489 |
| 1,276,665 | A * | 8/1918 | Leopold | C02F 1/001 210/292 |
| 1,401,199 | A * | 12/1921 | Simpson | B01J 20/00 210/505 |
| 1,531,095 | A * | 3/1925 | Hoehn | B01D 29/39 210/346 |
| 1,674,203 | A * | 6/1928 | Holz | C02F 1/001 210/489 |
| 1,723,564 | A * | 8/1929 | Lewis | C02F 1/003 210/287 |
| 1,726,035 | A * | 8/1929 | Bomonti | B01D 29/41 210/486 |
| 1,919,448 | A * | 7/1933 | Norquist | B01D 29/66 210/313 |
| 1,982,924 | A * | 12/1934 | Norquist | B01D 29/39 210/486 |
| 2,002,826 | A * | 5/1935 | Moran | B01D 29/39 210/346 |
| 2,028,466 | A * | 1/1936 | Moran | B01D 29/39 210/486 |
| 2,041,495 | A * | 5/1936 | Schwiers | B01D 29/66 210/420 |
| 2,190,305 | A * | 2/1940 | Auberschek | B01D 35/04 210/441 |
| 2,306,986 | A * | 12/1942 | Tolman | B01D 39/2003 210/486 |
| 2,426,618 | A * | 9/1947 | Klein | B01D 25/26 210/486 |
| 2,443,087 | A * | 6/1948 | Ulrich | B01D 29/39 210/486 |
| 2,468,296 | A * | 4/1949 | Jacobowitz | B01D 29/39 210/486 |
| 2,788,901 | A * | 4/1957 | Boeddinghaus | B01D 29/111 210/486 |
| 2,909,285 | A * | 10/1959 | Besler | B01D 29/94 210/330 |
| 3,295,687 | A * | 1/1967 | Schmerler | B01D 29/39 55/379 |
| 3,339,742 | A * | 9/1967 | Kracklauer | B01D 29/39 210/232 |
| 3,339,743 | A * | 9/1967 | Bealle | B01J 47/012 210/256 |
| 3,392,837 | A * | 7/1968 | Sanzenbacher | C02F 1/003 210/282 |
| 3,430,769 | A * | 3/1969 | Sanzenbacher | C02F 1/003 210/282 |
| 3,623,614 | A * | 11/1971 | Schmidt, Jr. | B01D 29/111 210/486 |
| 4,968,423 | A * | 11/1990 | McKale | B01D 29/43 210/486 |
| 5,035,799 | A * | 7/1991 | Rosberg | B01D 29/66 210/411 |
| 5,128,036 | A * | 7/1992 | Svensson | C02F 1/003 210/264 |
| 5,476,526 | A * | 12/1995 | Attermeyer | B01D 46/0002 55/496 |
| 5,562,824 | A * | 10/1996 | Magnusson | C02F 1/003 210/290 |
| 5,928,506 | A * | 7/1999 | Bae | C02F 1/003 210/123 |
| 6,013,180 | A * | 1/2000 | Wang | C02F 1/003 210/255 |
| 6,129,841 | A * | 10/2000 | Dann | C02F 1/003 210/260 |
| 6,248,244 | B1 * | 6/2001 | Dann | C02F 1/003 210/764 |
| D446,791 | S * | 8/2001 | Beckham | D15/1 |
| 6,331,246 | B1 * | 12/2001 | Beckham | B01D 35/30 210/136 |
| 6,419,821 | B1 * | 7/2002 | Gadgil | B01D 39/2068 210/256 |
| 6,602,425 | B2 * | 8/2003 | Gadgil | B01D 39/2068 210/744 |
| 7,014,759 | B2 * | 3/2006 | Radford | C02F 1/003 141/330 |
| 7,135,114 | B2 * | 11/2006 | Nonninger | B01D 63/0821 55/482 |
| 7,163,618 | B2 * | 1/2007 | Beckham | B01D 35/153 210/473 |
| 7,232,517 | B1 * | 6/2007 | Shepherd | C02F 1/003 250/435 |
| 7,306,723 | B2 * | 12/2007 | Radford | C02F 1/003 141/330 |
| 7,906,019 | B2 * | 3/2011 | Elliott | A01N 59/16 210/205 |
| 8,043,502 | B2 * | 10/2011 | Nauta | C02F 1/003 210/473 |
| 8,216,465 | B2 * | 7/2012 | Nauta | C02F 1/003 210/473 |
| 9,193,605 | B2 * | 11/2015 | Minton-Edison | C02F 1/002 |
| 9,352,252 | B2 * | 5/2016 | Vestergaard Frandsen | B01D 29/62 |
| 9,352,979 | B2 * | 5/2016 | Kuennen | C02F 3/06 |
| 9,975,068 | B1 * | 5/2018 | Maresh | B01D 24/00 |
| 10,336,639 | B2 * | 7/2019 | Kuennen | C02F 1/281 |
| 10,589,195 | B2 * | 3/2020 | Han | C02F 1/004 |
| 10,589,199 | B2 * | 3/2020 | See | C02F 1/444 |
| 10,589,200 | B2 * | 3/2020 | Maresh | C02F 1/001 |
| 10,647,592 | B2 * | 5/2020 | Geelhood | C02F 1/002 |
| 10,905,976 | B2 * | 2/2021 | Johnson | B01D 21/0012 |
| 11,161,062 | B2 * | 11/2021 | Johnson | C02F 9/20 |
| 11,202,975 | B2 * | 12/2021 | Han | C02F 1/004 |
| 11,247,153 | B2 * | 2/2022 | Han | C02F 1/44 |
| 11,872,506 | B2 * | 1/2024 | Weitz | B01D 24/38 |
| 11,938,424 | B2 * | 3/2024 | Han | C02F 1/003 |
| 12,311,292 | B2 * | 5/2025 | Song | B01D 29/15 |
| 12,318,720 | B2 * | 6/2025 | Johnson | B01D 29/58 |
| 2002/0113022 | A1 * | 8/2002 | Gadgil | B01D 39/2068 210/748.11 |
| 2003/0213733 | A1 * | 11/2003 | Beckham | A61M 1/79 210/500.1 |
| 2004/0134932 | A1 * | 7/2004 | Lobdell | B67D 3/0029 222/189.06 |
| 2006/0144781 | A1 * | 7/2006 | Carlson | B01D 61/20 210/473 |
| 2007/0080118 | A1 * | 4/2007 | Lindsley | B01D 35/0276 210/791 |

(56) References Cited

U.S. PATENT DOCUMENTS

| | | | |
|---|---|---|---|
| 2008/0217252 A1* | 9/2008 | Elliott | A01N 59/16 210/661 |
| 2011/0303589 A1* | 12/2011 | Kuennen | C02F 1/52 210/120 |
| 2012/0187052 A1* | 7/2012 | Elliott | A01N 59/16 210/764 |
| 2012/0267314 A1* | 10/2012 | Minton-Edison | C02F 1/44 210/695 |
| 2014/0144829 A1* | 5/2014 | Takeda | B01D 63/024 210/295 |
| 2014/0216993 A1* | 8/2014 | Pradeep | B01D 29/00 210/123 |
| 2015/0284260 A1* | 10/2015 | Huda | C02F 1/003 210/128 |
| 2016/0114271 A1* | 4/2016 | Michaud | C02F 1/003 210/807 |
| 2016/0236958 A1* | 8/2016 | Kuennen | C02F 1/283 |
| 2018/0154290 A1* | 6/2018 | See | C02F 1/002 |
| 2019/0209972 A1* | 7/2019 | Han | B01D 63/0821 |
| 2019/0247772 A1* | 8/2019 | Han | B01D 69/06 |
| 2020/0071189 A1* | 3/2020 | Geelhood | C02F 1/283 |
| 2020/0215463 A1* | 7/2020 | Johnson | B01D 35/027 |
| 2022/0047975 A1* | 2/2022 | Johnson | B01D 35/02 |
| 2022/0054958 A1* | 2/2022 | Han | B01D 36/001 |
| 2023/0166203 A1* | 6/2023 | Song | C02F 1/001 210/455 |
| 2024/0066450 A1* | 2/2024 | Lee | B01D 29/00 |

FOREIGN PATENT DOCUMENTS

| | | |
|---|---|---|
| KR | 20090129389 A | 12/2009 |
| KR | 1020150011745 A | 2/2015 |
| KR | 101516969 B1 | 4/2015 |
| KR | 20180116667 A | 10/2018 |
| KR | 20200006135 A | 1/2020 |
| KR | 20200071418 A | 6/2020 |

* cited by examiner

GRAVITY TYPE WATER-PURIFYING DEVICE

CROSS REFERENCE TO RELATED APPLICATION

This application is a 35 U.S.C. 371 National Phase Entry Application from PCT/KR2021/019272 filed Dec. 17, 2021, which claims priority to and the benefit of Korean Patent Application No. 10-2020-0183243, filed on Dec. 24, 2020, the disclosures of which are incorporated herein by reference in their entirety.

TECHNICAL FIELD

The present invention relates to a gravity-type water-purifying device.

BACKGROUND ART

Supplying clean and safe water is essentially necessary for health and survival of humans. However, since clean water is not sufficiently supplied in Africa or developing countries, people frequently use water in a contaminated pond or puddle as drinking water.

When drinking contaminated water, the drinker may get various infectious diseases due to microbes included in the contaminated water. That is, there is a problem that the microbes contained in the contaminated water cause illness such as abdominal pain, diarrhea, vomiting and the like, and in a severe case threaten the life of the drinker.

Accordingly, in order to prevent such problem, it is important to ensure that the food or water we eat is not contaminated by microbes.

Currently, since the overall mortality rate can be reduced merely if clean water and sufficient food are secured in developing countries, it can be said that the effect of environmental improvement, which can be achieved by supplying clean water, is far greater than advances in medicine or treatment technology.

However, since a conventional water purifier passes raw water through a filter by applying a certain water pressure to filter out foreign substances contained in the raw water, the purifier requires a pump facility capable of imparting the certain water pressure, and electrical facilities for operating the pump facility must also be provided. In the absence of such electrical facilities, there is a limitation that the conventional water purifier cannot be used.

DISCLOSURE

Technical Problem

The present invention has been devised in view of the above points, and an object of the present invention is to provide a gravity-type water-purifying device capable of conveniently producing filtered water by using gravity.

Another object of the present invention is to provide a gravity-type water-purifying device capable of reducing downtime by configuring a storage tank in which filtered water is stored in a movable manner so that it can be individually separated.

Technical Solution

In order to achieve the above objects, the present invention provides a gravity-type water-purifying device comprising: a filtered water production part including: a filter module for filtering out foreign substances contained in raw water by using gravity, a housing in which a filtration space is formed to store a certain amount of the raw water and to dispose the filter module therein, and an outflux formed in the housing to allow the filtered water produced through the filter module to be discharged to the outside; and a movable filtered water storage part in which a filtered water storage space is formed to store a certain amount of the filtered water produced from the filtered water production part, wherein the filtered water storage part is detachably connected to the filtered water production part through a connection pipe so as to be separable from the filtered water production part and be movable by itself, and is provided with an opening/closing unit for discharging the filtered water stored in the filtered water storage space to the outside.

In addition, the movable filtered water storage part may include a box-shaped storage tank including the filtered water storage space, and a fitting formed in the storage tank so as to be detachably coupled to an end of the connection pipe.

In addition, the connection pipe may further include a filter for re-filtering the filtered water moving from the outflux to the movable filtered water storage part.

In addition, the connection pipe may further include an opening/closing valve for allowing or blocking the movement of the filtered water from the outflux to the movable filtered water storage part.

In addition, the filter module may comprise: a plurality of plate-shaped filter members, which are formed in a plate shape having a predetermined area, produce filtered water from raw water introduced from the outside by gravity, and are spaced apart from each other in parallel along one direction while one surface of each filter member faces each other at a predetermined interval; and a filtered water integration member for fixing one side of each of the plurality of plate-shaped filter members so that the plurality of plate-shaped filter members can be kept spaced apart from each other along one direction while facing each other, and for integrating and discharging the filtered water individually produced from each of the plurality of plate-shaped filter members.

In addition, each of the plurality of plate-shaped filter members may include: a support frame comprising a loop-shaped edge member having an empty space open on both sides, and a partition member coupled to the edge member to partition the empty space into a plurality of storage spaces; a pair of filtration members formed in a plate shape having a predetermined area and coupled to both surfaces of the support frame to produce filtered water from raw water moving from the outside to the plurality of storage spaces; at least one communication path formed in the partition member to allow the plurality of storage spaces to communicate with each other; and a receiving port provided on one side of the support frame so as to communicate with any one of the plurality of storage spaces and connected to the filtered water integration member via a tube.

In addition, the communication path may be an accommodation groove formed to be recessed into the partition member.

In addition, the edge member may include a stepped portion formed along the inner side of the edge, and an edge side of the filtration member may be fixed to the stepped portion.

In addition, the partition member may include at least one lateral member having a predetermined length and at least one longitudinal member disposed to intersect the lateral member.

In addition, the filtration member may include a plate-shaped support having a predetermined area, and a nanofiber web layer formed of nanofiber and disposed on one surface or both surfaces of the support.

In addition, all of the plurality of plate-shaped filter members may be provided with the same filter member.

In addition, the filtered water integration member may include: a body having an integration space for integrating the filtered water incoming from each of the plurality of plate-shaped filter members; a plurality of protrusions protruding from one surface of the body to form a plurality of accommodation grooves into which one side of the plurality of plate-shaped filter members are respectively inserted; and a fastening member fastened to the body and passing through all of the plurality of protrusions so as to prevent each of the plate-shaped filter members respectively inserted into the plurality of accommodation grooves from being separated from the accommodation grooves.

In addition, the body may further include a plurality of inlets connected one-to-one to the receiving ports through a tube wherein the receiving ports are respectively provided in the plurality of plate-shaped filter members so as to introduce the filtered water individually produced by the plurality of plate-shaped filter members into the integration space, and at least one outlet for discharging the filtered water from the integration space to the outside.

Advantageous Effects

According to the present invention, filtered water can be simply produced by using gravity even under poor conditions in which power such as electricity is not supplied, thereby obtaining clean filtered water even in a poor environment. As such, it is possible to simply obtain filtered water even in a poor environment, thereby preventing diseases caused by ingestion of contaminated water and improving the quality of life.

In addition, according to the present invention, a storage tank in which filtered water is stored is configured in a movable manner so that it can be individually separated, whereby downtime can be reduced to increase the production of the filtered water.

MODES OF THE INVENTION

Figure 1:
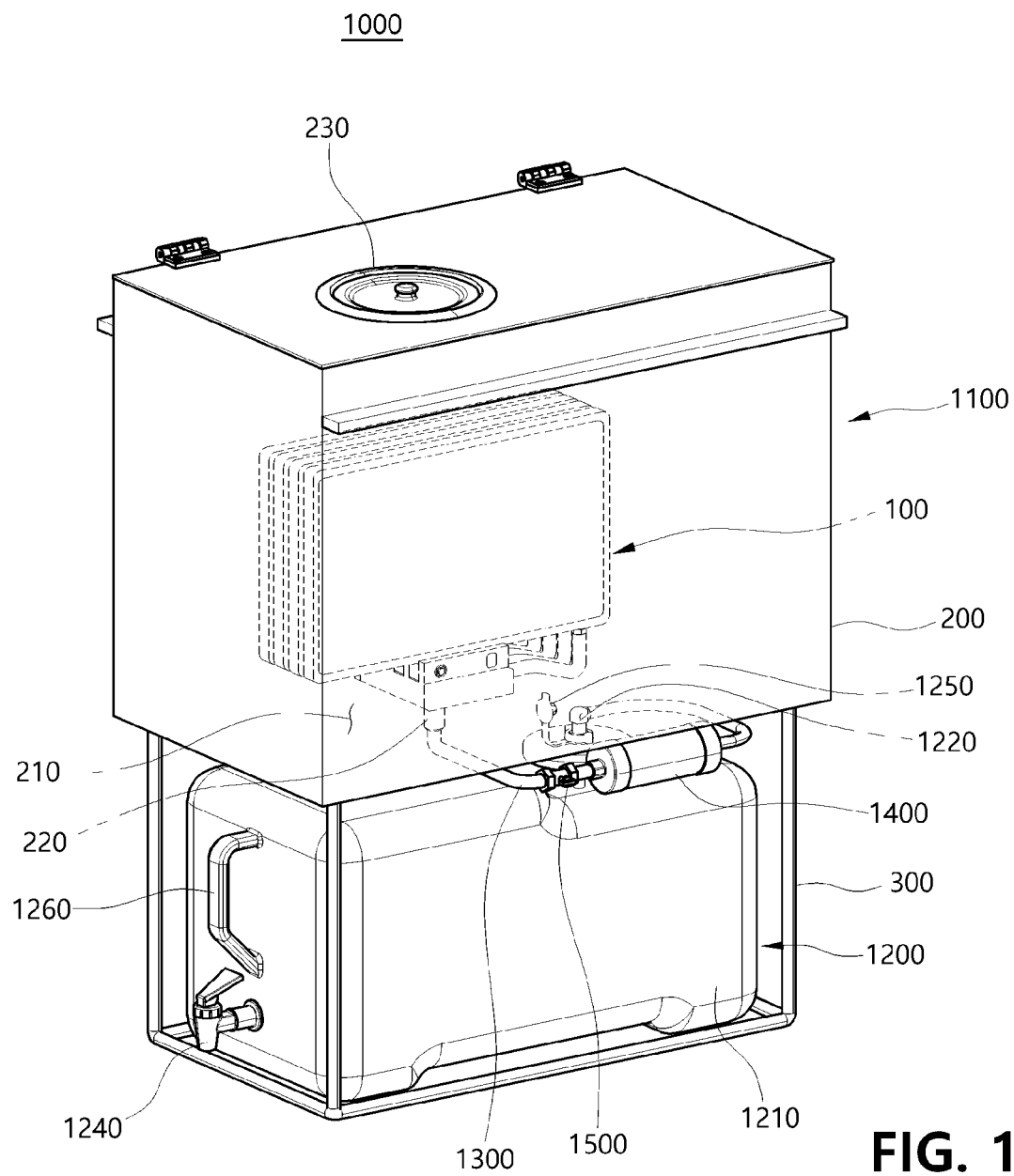
FIG. 1 is a view showing a gravity-type water-purifying device according to an embodiment of the present invention.

Hereinafter, with reference to the accompanying drawings, embodiments of the present invention will be described in detail so as to be easily implemented by one of ordinary skill in the art to which the present invention pertains. The present invention may be embodied in a variety of forms and is not be limited to the embodiments described herein. In order to clearly describe the present invention in the drawing, parts irrelevant to the description are omitted from the drawings; and throughout the specification, same or similar components will be referred to as like reference numerals.

A gravity-type water-purifying device 1000 according to an embodiment of the present invention may produce filtered water from raw water by using water pressure due to gravity or potential energy.

Herein, the filtered water may be used as potable water or drinking water.

In this case, the gravity-type water-purifying device 1000 according to an embodiment of the present invention may include a filter module 100 for producing filtered water from raw water, and the filtered water produced from the filter module 100 may be moved toward a storage tank 1210 through a connection pipe 1300 and be stored in the storage tank 1210. In addition, the storage tank 1210 may be detachably coupled to the connection pipe 1300.

Accordingly, in the gravity-type water-purifying device 1000 according to an embodiment of the present invention, the storage tank 1210 may be easily separated from the connection pipe 1300 to be replaced with another storage tank 1210.

That is, in the gravity-type water-purifying device 1000 according to an embodiment of the present invention, when the storage tank 1210 is full of the filtered water or the storage tank 1210 needs to be washed, the storage tank 1210 connected to the connection pipe 1300 may be easily replaced with another storage tank.

Through this, in the gravity-type water-purifying device 1000 according to an embodiment of the present invention, downtime during which the filtered water cannot be produced may be reduced, and contamination of the filtered water that may occur in the process of transferring the filtered water produced from the filter module 100 to another storage container may be prevented in advance.

Figure 2:
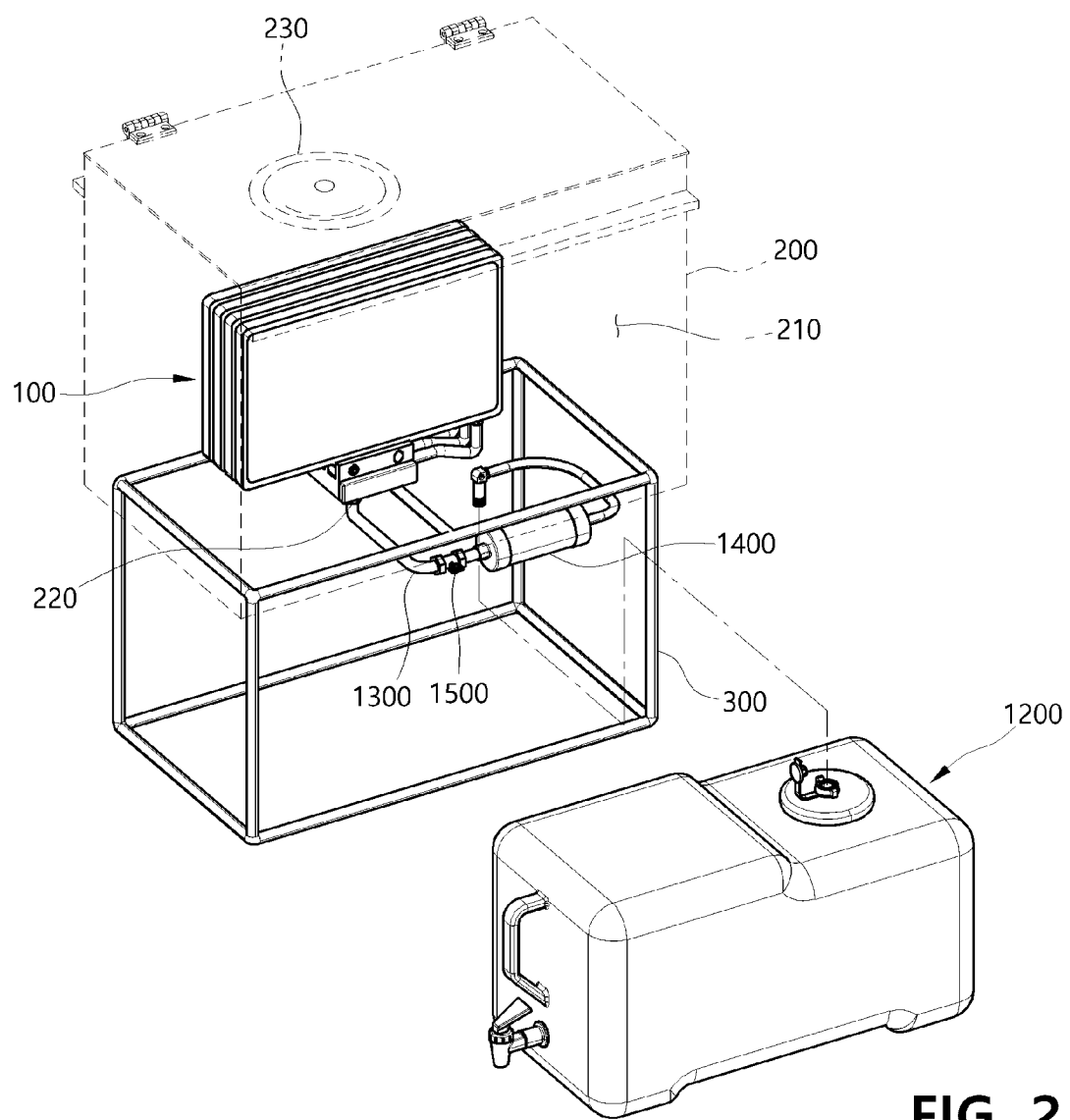
FIG. 2 is a view showing a state in which a movable filtered water storage part in FIG. 1 is separated.
Figure 3:
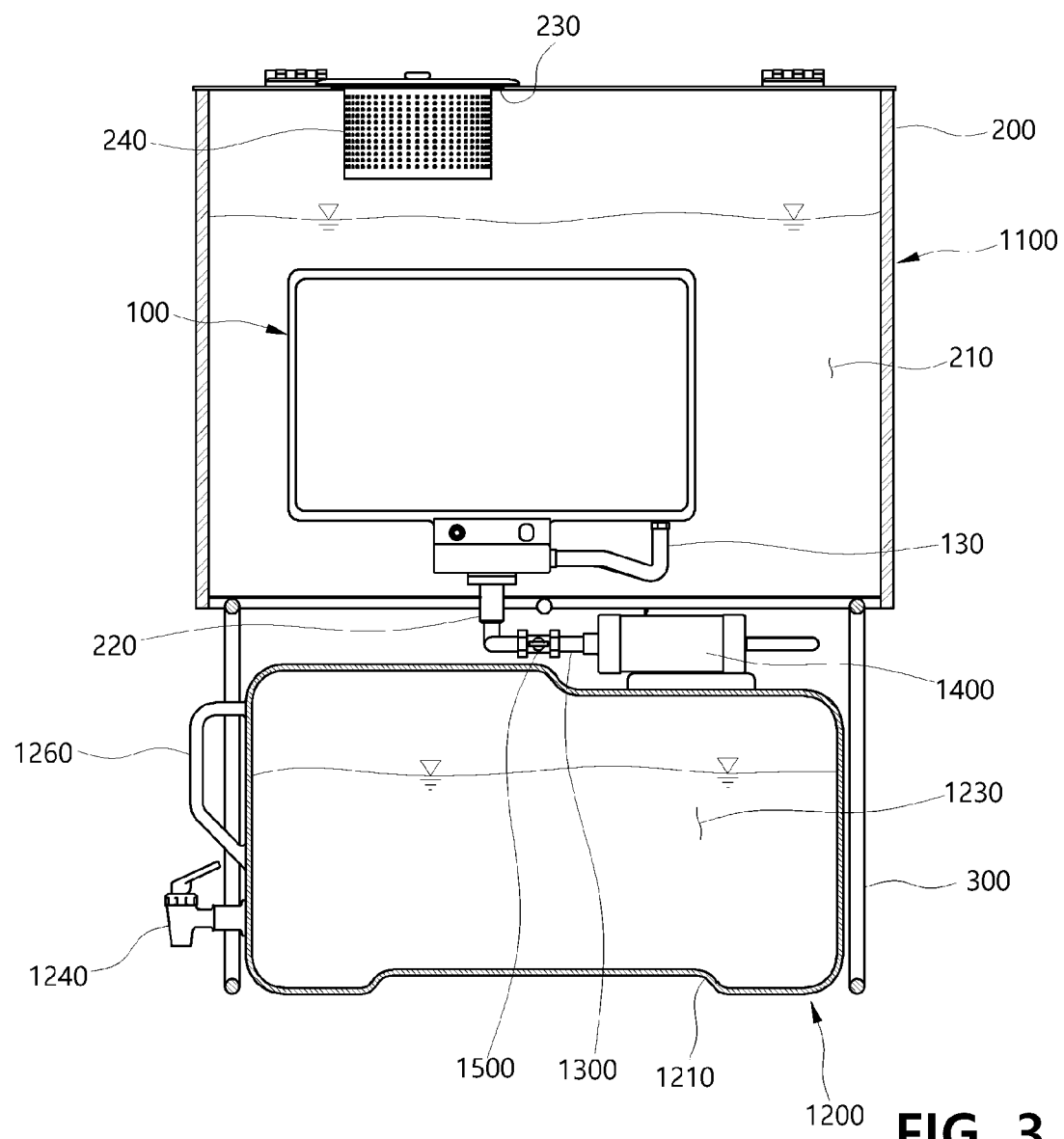
FIG. 3 is a front view showing a housing and a movable filtered water storage part in FIG. 1 partially cut away.

To this end, the gravity-type water-purifying device 1000 according to an embodiment of the present invention includes a filtered water production part 1100 and a movable filtered water storage part 1200 as shown in FIGS. 1 to 3, and the filtered water production part 1100 may be connected to the movable filtered water storage part 1200 via the connection pipe 1300.

The filtered water production part 1100 may produce the filtered water from raw water by using gravity as described above.

To this end, the filtered water production part 1100 may include a filter module 100 and a housing 200.

Specifically, the housing 200 may include a filtration space 210 in which raw water to be treated is stored, and the filter module 100 may be disposed in the filtration space 210.

For example, as shown in FIG. 3, the housing 200 may be formed in a box shape having an internal space of a predetermined volume, and the internal space may be the filtration space 210 in which a certain amount of the raw water is stored and the filter module 100 is disposed.

Accordingly, when the filtration space 210 is filled with the raw water, at least a portion of the filter module 100 may be submerged in the raw water filled in the filtration space 210 as shown in FIG. 3.

In this case, the filtered water production part 1100 may include an outflux 220 for discharging the filtered water produced from the filter module 100 to the movable filtered water storage part 1200.

For example, the outflux 220 may be formed on the bottom surface of the housing 200, and the outlet 127 of the filter module 100 may be coupled to the outflux 220. In addition, the end of the connection pipe 1300 interconnecting the filtered water production part 1100 and the movable filtered water storage part 1200 may be coupled to the outflux 220.

In this case, the outflux 220 may serve both as a role of discharging the filtered water produced from the filter module 100 to the outside and as a fastener for fastening the outlet 127 of the filter module 100.

Accordingly, when the filtered water produced from the filter module 100 is discharged from the filtration space 210 through the outflux 220, the filtered water may move to the movable filtered water storage part 1200 along the connection pipe 1300. Accordingly, the water level of the raw water filled in the filtration space 210 may be lowered, and the pressure due to gravity generated as the water level of the raw water is lowered may be applied to the filter module 100.

As a result, the filter module 100 may produce filtered water by filtering out foreign substances from the raw water by using the gravity generated when the water level of the raw water changes. A detailed description of the filter module 100 will be provided later.

As such, the gravity-type water-purifying device 1000 according to an embodiment of the present invention may produce filtered water by using the filter module 100 in the filtration space 210, and the filtered water produced in the filtration space 210 by the filter module 100 may move to the movable filtered water storage part 1200 through the outflux 220.

As a result, the gravity-type water-purifying device 1000 according to an embodiment of the present invention may easily produce filtered water without using additional power such as electricity, whereby filtered water may be easily produced even in a harsh environment where infrastructure such as electricity is not installed or electricity is difficult to supply.

In the drawings and description, it has been shown and described that the outflux 220 for discharging the filtered water produced from the filter module 100 to the movable filtered water storage part 1200 is formed on the bottom surface of the housing 200, but the present invention is not limited thereto, and the position of the outflux 220 may be changed to an appropriate location according to design conditions in consideration of the connection relationship with the filter module 100.

For example, if the outflux 220 may move the filtered water produced from the filter module 100 to the movable filtered water storage part 1200 through the connection pipe 1300 without flowing out to the filtration space 210, it may be formed in the housing 200 so as to be located in an appropriate position.

In this case, the housing 200 may further include an inlet 230 for supplying the raw water to the filtration space 210. In this case, as shown in FIG. 3, a filtering net 240 may be detachably coupled to the inlet 230. Such a filtering net 240 may filter out bulky foreign substances such as fallen leaves or tree branches included in raw water when the raw water is supplied to the filtration space 210.

Meanwhile, the gravity-type water-purifying device 1000 according to an embodiment of the present invention may further include a support part 300 for supporting the housing 200.

Such a support part 300 may support one side of the housing 200 so that the housing 200 may be disposed in a state of being spaced apart from the bottom surface by a certain height.

For example, the support part 300 may be a frame structure formed to have a predetermined height, and may support the lower surface of the housing 200.

Herein, the support part 300 may be configured separately from the housing 200, or may be formed integrally with the housing 200.

As described above, the movable filtered water storage part 1200 may be connected to the filtered water production part 1100 via a connection pipe 1300 having one end connected to the outflux 220.

Accordingly, the movable filtered water storage part 1200 may store a certain amount of the filtered water produced from the filter module 100 therein.

To this end, the movable filtered water storage part 1200 may include a storage tank 1210 having a filtered water storage space 1230 for storing a certain amount of the filtered water introduced from the filtered water production part 1100, and the storage tank 1210 may include a fitting 1220 to which an end of the connection pipe 1300 is connected.

Accordingly, the filtered water produced from the filtered water production part 1100 may be introduced into the filtered water storage space 1230 through the connection pipe 1300.

Figure 4:
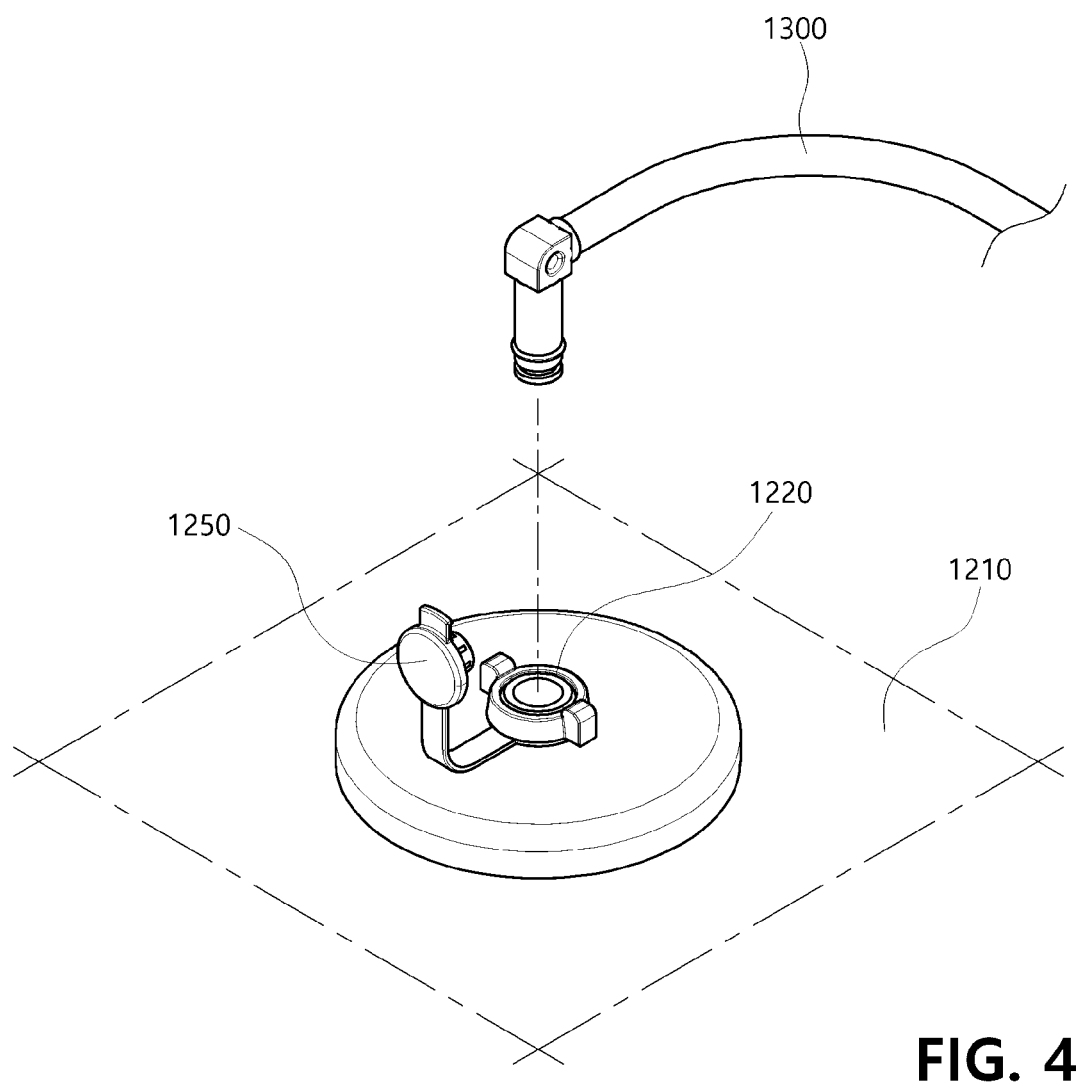
FIG. 4 is a view showing a connection relationship between a connection pipe and a storage tank that can be applied to a gravity-type water-purifying device according to an embodiment of the present invention.

In this case, as shown in FIG. 4, an end of the connection pipe 1300 may be detachably coupled to the fitting 1220.

Accordingly, when the storage tank 1210 needs to be washed or a large amount of the filtered water is filled in the filtered water storage space 1230, the user may easily replace the storage tank 1210 with another storage tank by separating the end of the connection pipe 1300 from the fitting 1220.

As a result, in the gravity-type water-purifying device 1000 according to an embodiment of the present invention, the storage tank 1210 may be easily replaced through the coupling and separation of the connection pipe 1300 and the fitting 1220, whereby the filtered water may be continuously produced through the filter module 100.

That is, in the gravity-type water-purifying device 1000 according to an embodiment of the present invention, the storage tank 1210 may be individually separated and combined with the connection pipe 1300, thereby reducing downtime during which the production of filtered water is stopped.

In this case, as shown in FIG. 4, the storage tank 1210 may further include a stopper 1250 for opening and closing the fitting 1220, and a handle 1260 for allowing the user to easily handle the storage tank 1210.

In addition, the storage tank 1210 may further include an opening/closing unit 1240 for discharging the filtered water filled in the filtered water storage space 1230 to the outside through a user's manipulation. For example, the opening/closing unit 1240 may be a well-known opening/closing valve.

Accordingly, when a certain amount of filtered water is filled in the filtered water storage space 1230, the user may separate the connection pipe 1300 from the fitting 1220 and then cover the fitting 1220 with the stopper 1250.

Through this, the stopper 1250 may prevent foreign substances from flowing into the filtered water storage space 1230 from the outside.

In addition, the user may conveniently move the storage tank 1210 to a desired position by using the handle 1260 in a state in which the filtered water storage space 1230 is filled with a certain amount of filtered water.

Further, when the user wants to use the filtered water, the filtered water stored in the filtered water storage space 1230 may be taken out by manipulating the opening/closing unit 1240. Thus, the user may conveniently use the filtered water stored in the filtered water storage space 1230.

As described above, in the gravity-type water-purifying device 1000 according to an embodiment of the present invention, the movable filtered water storage part 1200 has the storage tank 1210 implemented as a portable water bottle type so that it may be moved and stored individually, thereby improving user convenience.

In addition, when the user wants to use the filtered water produced from the filter module 100 in the gravity-type water-purifying device 1000 according to an embodiment of the present invention, the user may directly take out the filtered water stored in the filtered water storage space 1230 through the opening/closing unit 1240 provided in the storage tank 1210.

Accordingly, since it is not necessary to move the filtered water filled in the storage tank 1210 to a separate storage container for use of the filtered water, contamination of the filtered water that may occur in the process of moving the filtered water to a separate storage container may be prevented in advance.

Meanwhile, the gravity-type water-purifying device 1000 according to an embodiment of the present invention may further include an opening/closing valve 1500 in the connection pipe 1300 for allowing or blocking the movement of filtered water produced from the filter module 100 toward the movable filtered water storage part 1200.

That is, when the storage tank 1210 needs to be replaced, the user may block the movement of filtered water produced from the filter module 100 toward the movable filtered water storage part 1200 along the connection pipe 1300 by manipulating the opening/closing valve 1500.

In such a case, since the discharge of the filtered water through the outflux 220 from the filtration space 210 is blocked, the production of filtered water using the filter module 100 may be stopped.

Accordingly, the user may temporarily stop the production of filtered water by manipulating the opening/closing valve 1500 if necessary, whereby even if the end of the connection pipe 1300 is separated from the fitting 1220 of the storage tank 1210, it may be minimized that the filtered water is discarded to the outside from the end of the connection pipe 1300 separated from the fitting 1220.

In this case, the gravity-type water-purifying device 1000 according to an embodiment of the present invention may further include a filter 1400 to further improve the quality of the filtered water by filtering the filtered water produced by the filtered water production part 1100 again.

Such a filter 1400 may secondarily filter the filtered water produced by the filter module 100. Accordingly, the filtered water may be secondarily filtered through the filter 1400 and then moved to the filtered water storage space 1230 of the storage tank 1210.

To this end, the filter 1400 may be provided in the connection pipe 1300 connecting the filtered water production part 1100 and the storage tank 1210 to each other.

For example, the filter 1400 may improve the quality of the filtered water by removing the odor of the filtered water produced through the filter module 100 and/or harmful chemicals included in the filtered water.

As a non-limiting example, the filter 1400 may be a known carbon filter, but the type of the filter 1400 is not limited thereto, and any of the known various filters may be used without limitation as long as it may improve the quality of the filtered water produced from the filter module 100 so that the filtered water may be used as potable water or drinking water. In addition, the filter 1400 may be changed to a suitable type depending on a place where the gravity-type water-purifying device 1000 according to an embodiment of the present invention is installed or used.

Accordingly, the filtered water produced through the filter module 100 in the filtered water production part 1100 may be filtered again while passing through the filter 1400 in the process of moving to the storage tank 1210 side along the connection pipe 1300.

As a result, the filtered water in a state of being filtered twice through the filter module 100 disposed in the filtration space 210 and the filter 1400 provided in the connection pipe 1300 may be stored in the storage tank 1210.

Meanwhile, as described above, the filter module 100 may produce the filtered water by filtering out foreign substances included in raw water using gravity.

As such a filter module 100, any known various filter modules may be used without limitation as long as they may filter out foreign substances from raw water, but preferably may be configured to increase the production of filtered water.

Figure 5:
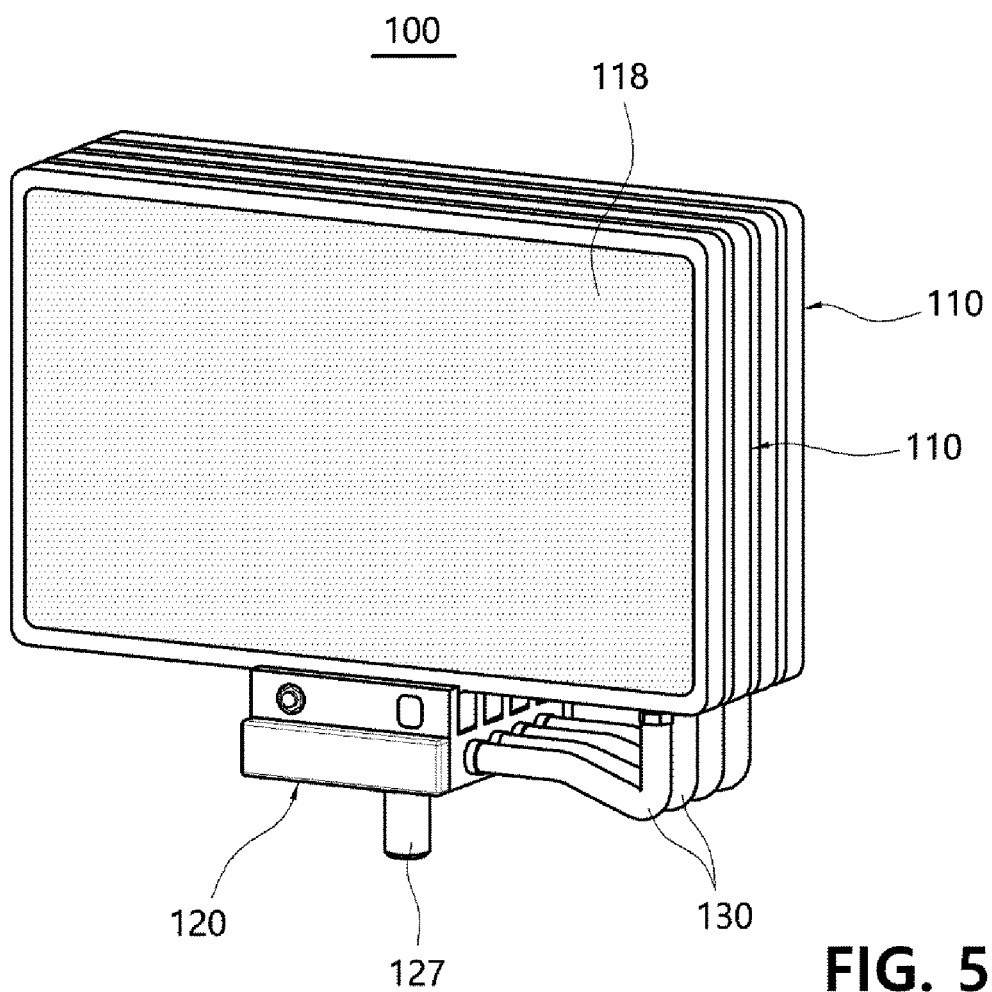
FIG. 5 is a view showing a filter module extracted from FIG. 1.
Figure 6:
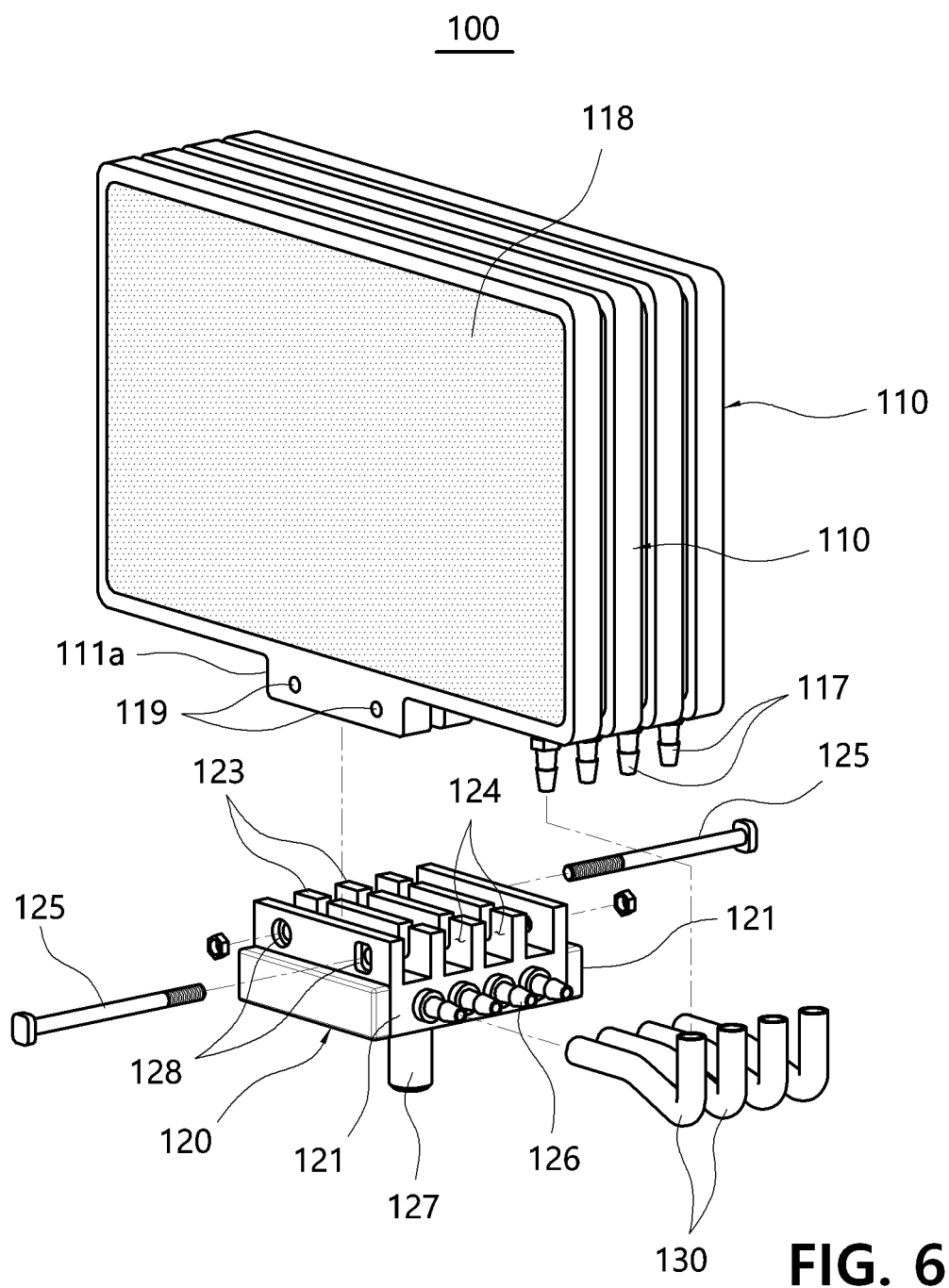
FIG. 6 is an exploded view of FIG. 5.
Figure 7:
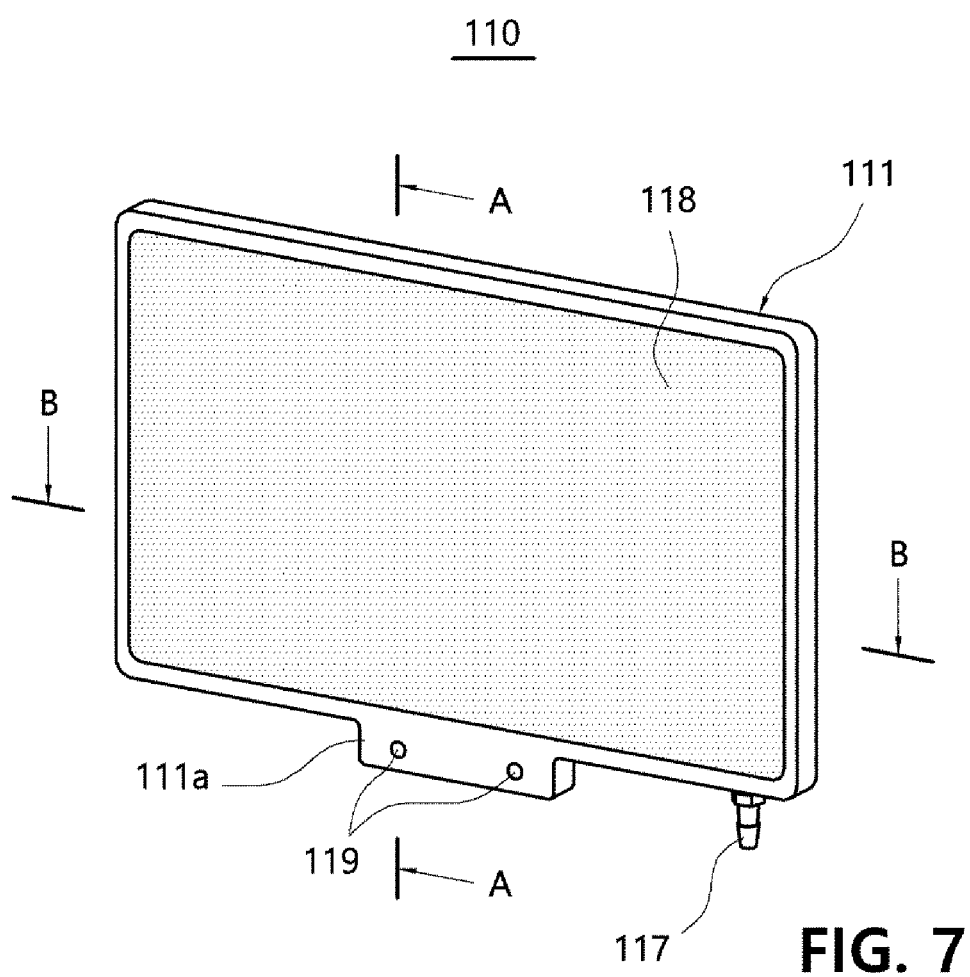
FIG. 7 is a view showing a plate-shaped filter member applicable to a filter module in a gravity-type water-purifying device according to an embodiment of the present invention.

As a non-limiting example, the filter module 100 may include a plurality of plate-shaped filter members 110 and a filtered water integration member or manifold 120 as shown in FIGS. 5 and 6.

The plurality of plate-shaped filter members 110 may produce the filtered water from the raw water by using water pressure caused by gravity or potential energy in a state in which at least a portion thereof is submerged in the raw water.

In this case, each of the plurality of plate-shaped filter members 110 may be formed in a plate shape having a predetermined area. In addition, the plurality of plate-shaped filter members 110 may be disposed so that one surface of each filter member faces each other at a predetermined interval, and may be spaced apart from each other in parallel along one direction.

Accordingly, since each of the plate-shaped filter members 110 in the filter module 100 may individually produce filtered water, the production of filtered water per unit time may be increased.

In this case, each of the plurality of plate-shaped filter members 110 may be provided in a different form, but may be provided in the same form.

Through this, all of the plurality of plate-shaped filter members 110 in the filter module 100 may be manufactured by using one mold or manufacturing facility, thereby reducing the production cost for producing the plate-shaped filter members.

In addition, the total number of use of the plate-shaped filter member 110 in the filter module 100 may be easily adjusted according to the amount of filtered water required per hour, thereby enhancing the convenience of use.

The plate-shaped filter member 110 may include a support frame 111, a pair of filtration members 118, a communication path 116 and a receiving port 117 as shown in FIGS. 7 to 10.

The support frame 111 may support the pair of filtration members 118 and also provide a space for temporarily storing the filtered water produced by the filtration members 118.

To this end, the support frame 111 may include a loop-shaped edge member 112 having an empty space therein, and a partition member 114 coupled to the edge member 112 so that the empty space may be partitioned into a plurality of storage spaces 115.

Figure 8:
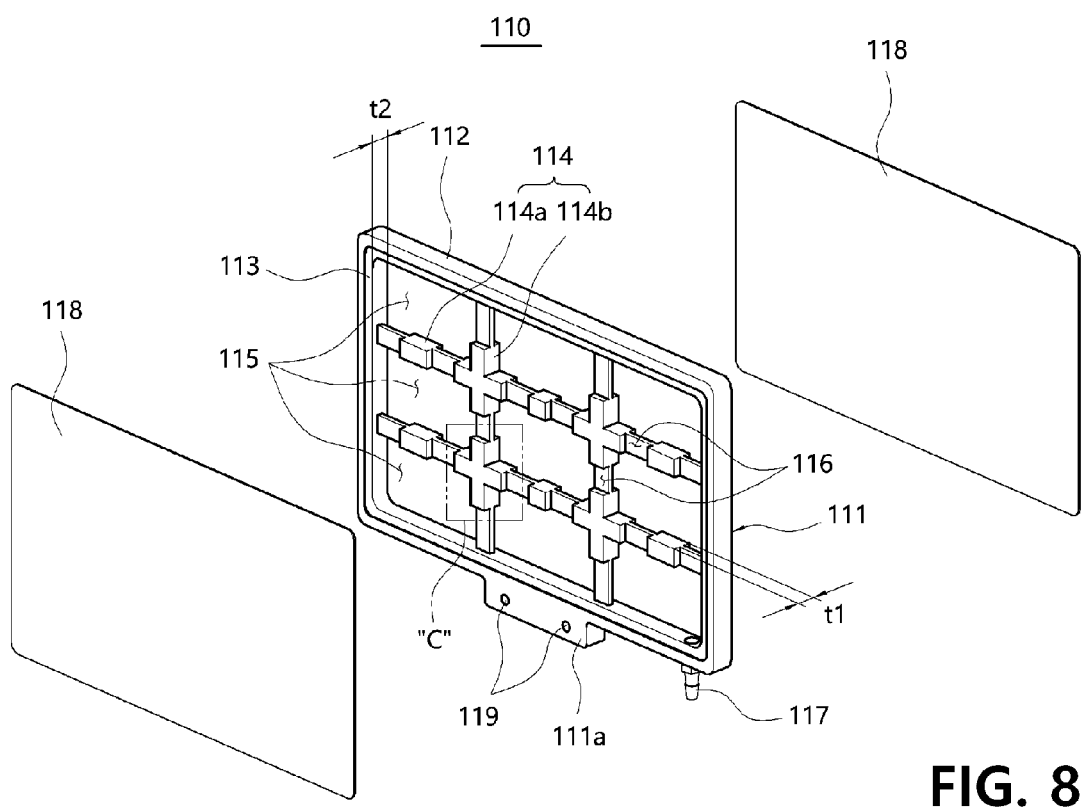
FIG. 8 is a view showing a state in which the filtration member in FIG. 7 is separated.

For example, as shown in FIG. 8, the edge member 112 may be a rectangular frame structure with both surfaces open, and the partition member 114 may be a straight member connecting two opposite sides of the edge member 112 to each other.

Further, the partition member 114 may include at least one lateral member 114a having a predetermined length and at least one longitudinal member 114b disposed to intersect the lateral member 114a.

Figure 9:
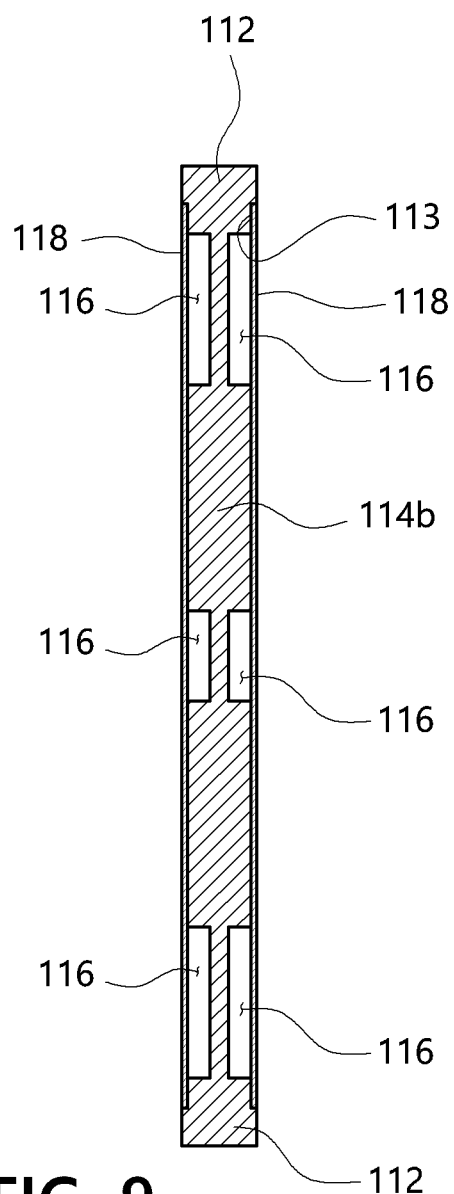
FIG. 9 is a cross-sectional view taken along line A-A of FIG. 7.
Figure 10:
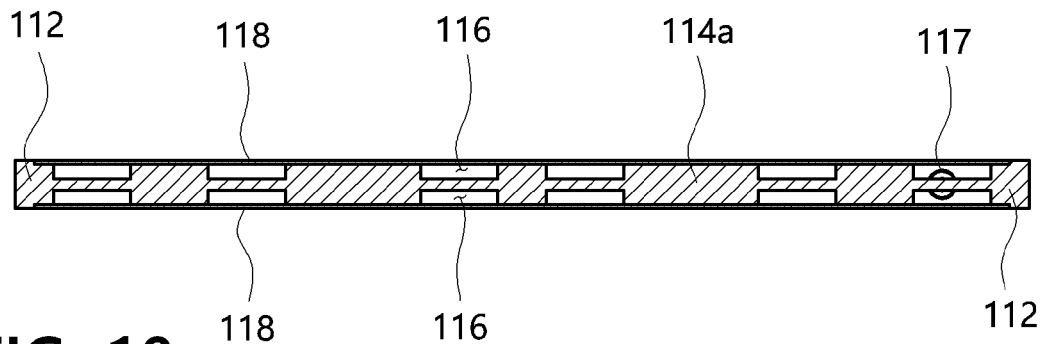
FIG. 10 is a cross-sectional view taken along line B-B of FIG. 7.

Accordingly, as shown in FIGS. 9 and 10, when the pair of filtration members 118 are attached to both surfaces of the edge member 112, respectively, the pair of filtration members 118 may be respectively supported by both surfaces of the edge member 112, and may be maintained in a state spaced apart from each other through the thickness of the edge member 112.

In this case, the filtration member 118 may be provided in a form of a plate-shaped sheet, and the edge side thereof may be attached to one surface of the edge member 112.

Accordingly, the filtration member 118 may be maintained in a plate-like shape by the support frame 111, and may increase the output or flow rate of filtered water by increasing the contact area with the raw water.

However, the shape of the frame member 112 is not limited thereto, and may be appropriately changed to any one of a circular shape, an arc shape, a polygonal shape, and a combination thereof depending on the shape of the filtration member 118.

In addition, the partition member 114 may be composed of only any one of the lateral member 114a and the longitudinal member 114b, and in case any one of the lateral member 114a and the longitudinal member 114b is provided in plurality, the plurality of lateral member 114a or the plurality of longitudinal member 114b may be arranged to be spaced apart and parallel to each other.

In this case, the partition member 114 may serve to partition the empty space into a plurality of storage spaces 115 and also support the filtration member 118.

Accordingly, the edge of the filtration member 118 may be supported by the edge member 112, and the remaining inner region of the filtration member 118 except for the edge thereof may be supported by the partition member 114.

As a result, when the filtration member 118 is provided as a plate-shaped sheet having a predetermined area, even if water pressure is applied to the filtration member 118 while the raw water passes through the filtration member 118, the filtration member 118 may be maintained in a plate-like shape without being bent or deformed by the water pressure.

In this case, the edge member 112 may include a stepped portion 113 formed to be recessed inward to a certain depth along the inner side of the edge, and the stepped portion 113 may be formed on each of both surfaces of the edge member 112.

In this case, as shown in FIG. 8, a thickness t2 of the edge member 112 in the portion where the stepped portion 113 is formed may have the same thickness as a thickness t1 of the partition member 114.

Accordingly, when the pair of filtration member 118 are respectively attached to both surfaces of the support frame 111, the edge of the filtration member 118 may be in close contact with the stepped portion 113 as shown in FIG. 9; the inner region of the filtration member 118 may be supported by the partition member 114; and the edge portion and inner portion of the filtration member 118 may form a horizontal plane.

The at least one communication path 116 may be formed in the partition member 114.

Figure 11:
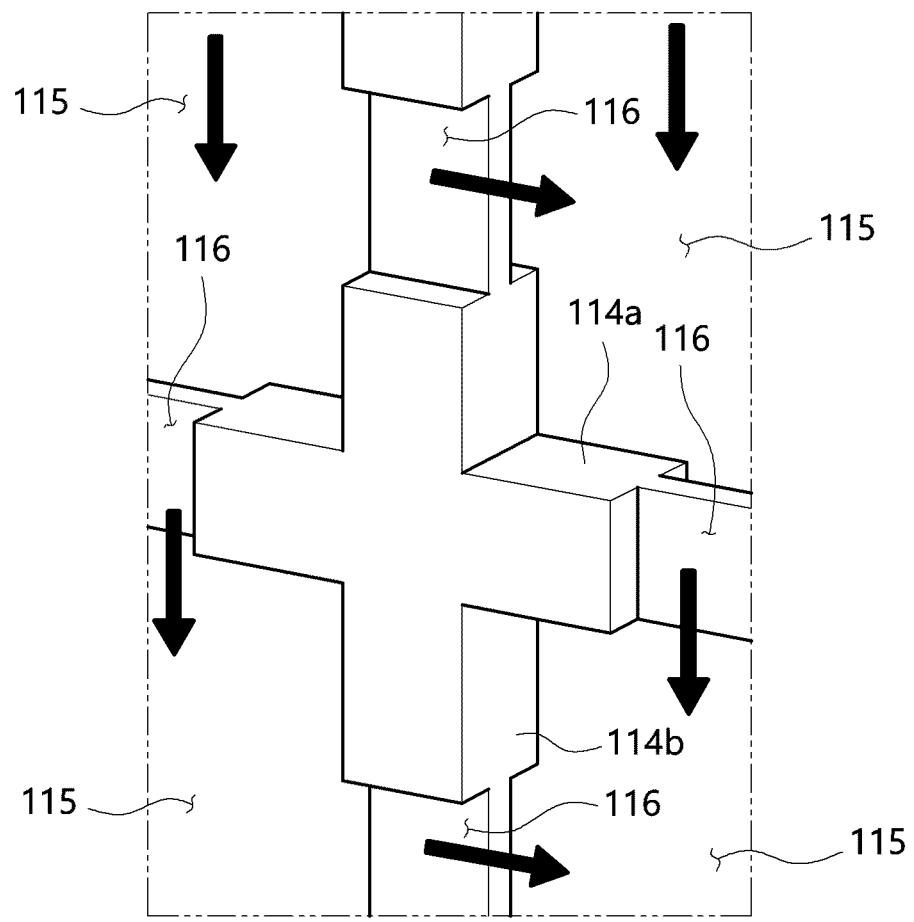
FIG. 11 is an enlarged view of part C in FIG. 8.

As shown in FIG. 11, the communication path 116 may connect a plurality of storage spaces 115 formed inside the edge member 112 to each other through the partition member 114.

Accordingly, the filtered water produced while passing through the filtration member 118 may move toward the receiving port 117 via the plurality of storage spaces 115.

For example, in case the partition member 114 includes both the lateral member 114a and the longitudinal member 114b, the communication path 116 may be formed in each of the lateral member 114a and the longitudinal member 114b.

In addition, the communication path 116 may be a through-hole formed through the lateral member 114a and the longitudinal member 114b, but may also be an accommodation groove formed to be recessed inwardly from one surface of the lateral member 114a and the longitudinal member 114b. In this case, the bottom surface of the communication path 116 may face one surface of the filtration member 118.

That is, when the pair of filtration member 118 are respectively attached to both surfaces of the support frame 111, the communication path 116 may be formed on each of both surfaces of the partition member 114 so that the bottom surface thereof may face one surface of the pair of filtration members 118, respectively.

Accordingly, the filtration member 118 may produce the filtered water not only in an area corresponding to the storage space 115, but also in a portion of the partition member 114 where the communication path 116 is formed.

Accordingly, even if the partition member 114 supports the inner region of the filtration member 118, an area in which the filtered water cannot be produced may be minimized, thereby further increasing the output of filtered water.

Although the drawings show that the communication paths 116 formed on each of both surfaces of the partition member 114 are formed at positions overlapping each other, the formation position of the communication path 116 is not limited thereto, and the position of the communication path formed on one surface of the partition member 114 may not overlap with the position of the communication path formed on the opposite surface.

The filtration member 118 may be provided in a pair as described above and may be attached to each of both surfaces of the support frame 111.

The above filtration member 118 may filter out foreign substances contained in the raw water while the raw water to be filtered moves from the outside of the filtration member 118 to the storage space 115 by gravity or water pressure.

In this case, the filtration member 118 may be provided as a plate-shaped sheet so as to increase the contact area with the raw water.

Herein, although any known filtration member used for water treatment may be applied as the filtration member 118, the filtration member 118 may also be a plate-shaped sheet comprising a support 118a and a nanofiber web layer 119b disposed on one or both surfaces of the support 118a.

In the present invention, the nanofiber web layer 119b may filter out foreign substances contained in the raw water, and the support 118a may support the nanofiber web layer 119b and serve as a moving passage for diffusing the filtered water produced by the nanofiber web layer 119b over the entire area of the filtration member 118.

Figure 15:
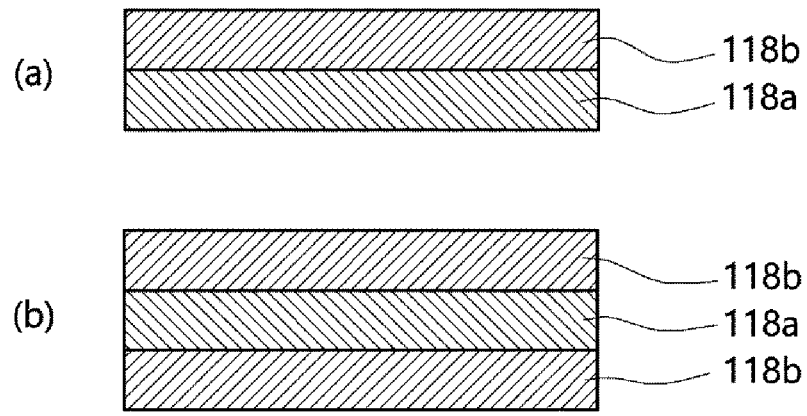
FIG. 15 is a schematic diagram illustrating a detailed configuration of a filtration member applicable to a plate-shaped filter member in a gravity-type water-purifying device according to an embodiment of the present invention.

As a non-limiting example, the filtration member 118 may have a two-layer structure in which the nanofiber web layer 119b is directly attached to one surface of the support 118a as shown in FIG. 15(a).

Alternatively, the filtration member 118 may have a three-layer structure in which a pair of nanofiber web layers 119b are directly attached to both surfaces of the support 118a, respectively, as shown in FIG. 15(b). In this case, even if the nanofiber web layer 119b attached to the outside of the support 118a among the nanofiber web layers 119b attached to both sides of the support 118a is damaged when washing to remove foreign substances attached to the surface of the filtration member 118, the nanofiber web layer 119b attached to the inside of the support 118a may be maintained in its original shape. Accordingly, the nanofiber web layer 119b may prevent the filtration efficiency of the filtration member 118 from being lowered, and further enhance the quality of the filtered water by filtering the filtered water passing through the support 118a again.

In this case, the nanofiber web layer 119b may be laminated to one surface of the support 118a through thermal welding, ultrasonic welding, high-frequency welding, etc., and one surface of the filtration member 118 may be attached to one surface of the support frame 111 through ultrasonic welding.

In addition, the support 118a may be a porous substrate so that the filtered water produced through the nanofiber web layer 119b may be diffused. For example, the support 118a may be any one of commonly used known woven, knitted, or non-woven fabrics.

Further, the nanofiber web layer 119b may be formed of nanofibers to filter out foreign substances contained in the liquid to be filtered, and the nanofiber web layer 119b may include a nanofiber web of a three-dimensional network structure.

In this case, the nanofiber may include a fiber-forming component, including polyacrylonitrile (PAN) and polyvinylidene fluoride (PVDF), and an emulsifier for improving the miscibility of the fiber-forming component.

The nanofiber web layer 119b may be provided as a single layer or as a multilayer.

The receiving port 117 may discharge the filtered water produced through the filtration member 118 from the plurality of storage spaces 115 to the outside.

To this end, the receiving port 117 may be provided on one side of the support frame 111 to communicate with any one of the plurality of storage spaces 115.

Accordingly, the filtered water produced through the filtration member 118 may move from each storage space 115 to the storage space 115 in communication with the receiving port 117 through the communication path 116 and then be discharged to the outside through the receiving port 117.

The filtered water integration member 120 may fix one side of each of the plate-shaped filter members 110 so that the plurality of plate-shaped filter members 110 may be maintained in a state spaced apart in parallel with each other at a distance along one direction while facing each other. Further, the filtered water integration member 120 may integrate the filtered water individually produced from each of the plurality of plate-shaped filter members 110.

That is, the filtered water integration member 120 may serve as a coupling member for fixing each of the plurality of plate-shaped filter members 110, as a spacer member for maintaining a spaced distance between two plate-shaped filter members 110 spaced apart in parallel with each other, and further as a collecting member for integrating the filtered water produced from each of the plate-shaped filter members 110 into one.

Figure 12:
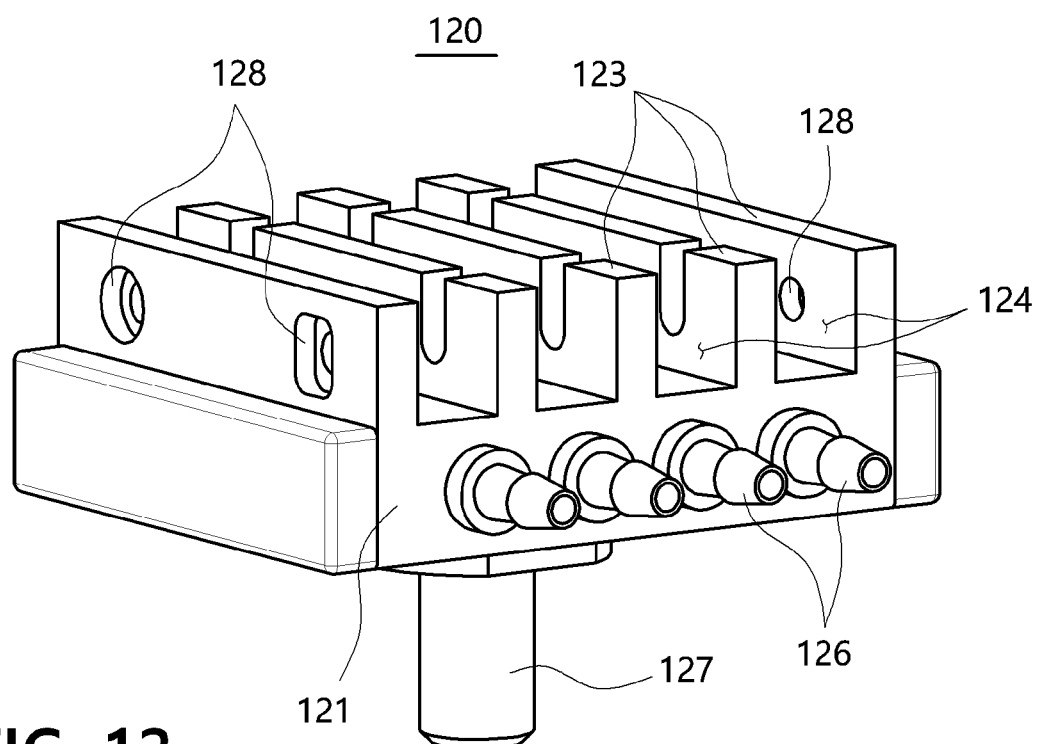
FIG. 12 is a view showing a filtered water integration member applicable to a filter module in a gravity-type water-purifying device according to an embodiment of the present invention.
Figure 13:
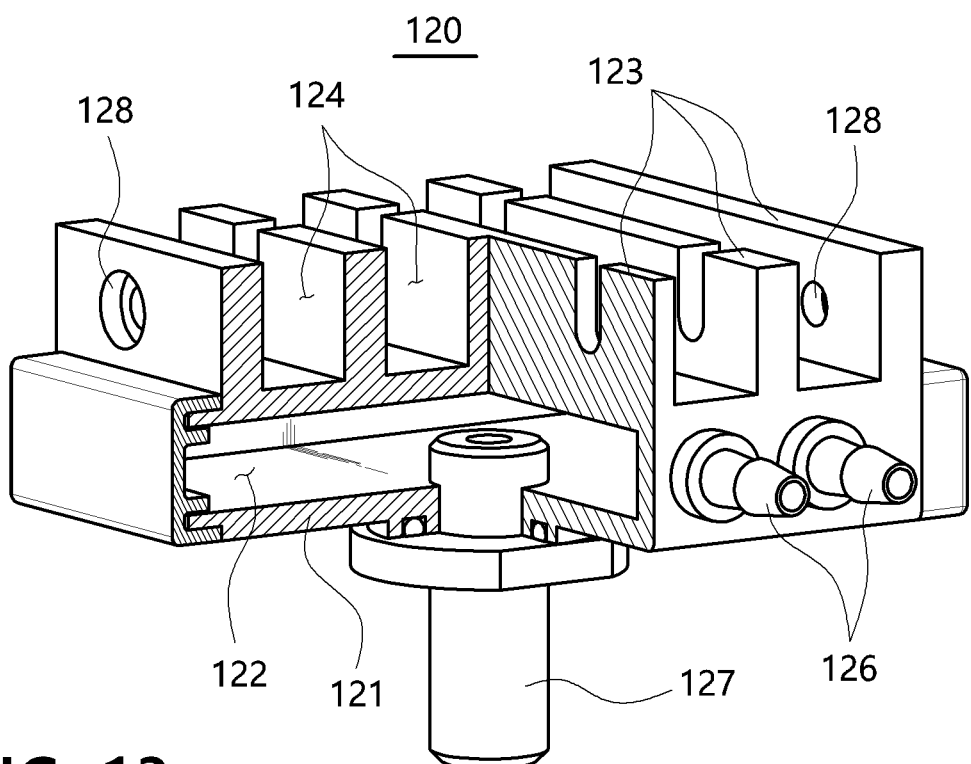
FIG. 13 is a view showing a state in which a part in FIG. 12 is cut away.
Figure 14:
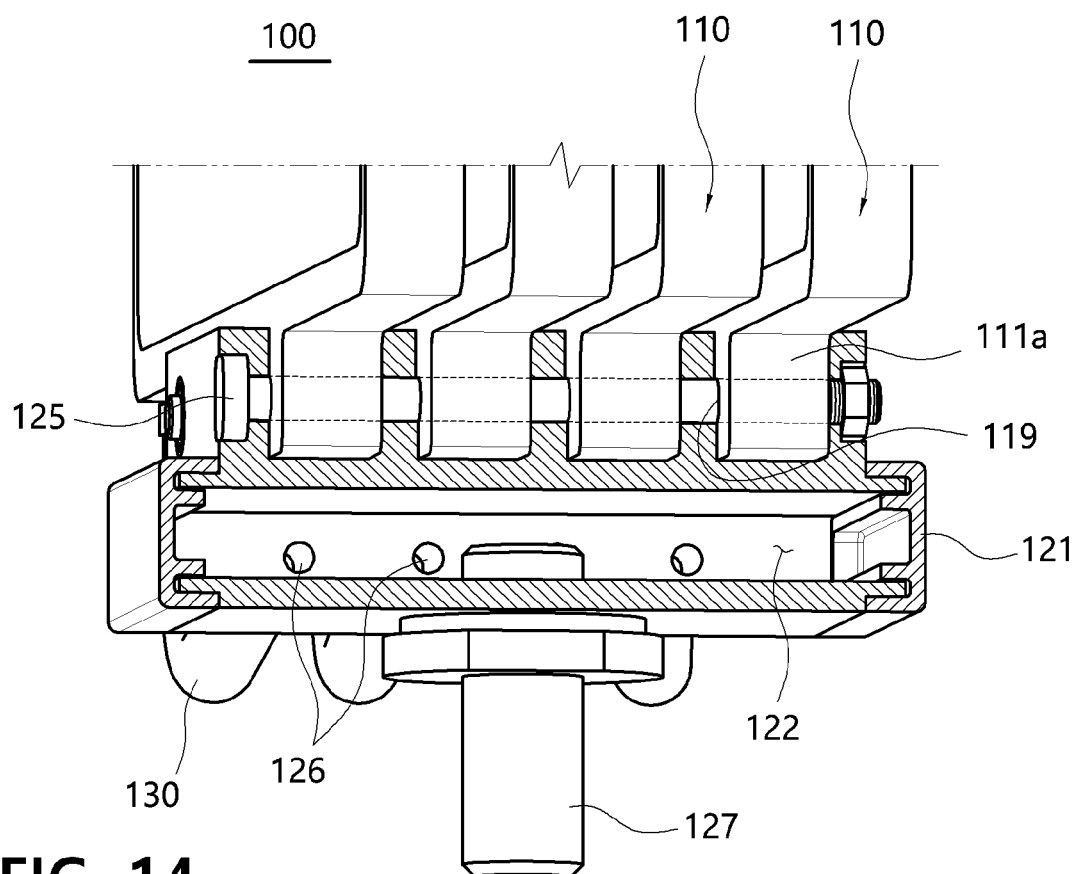
FIG. 14 is a view showing a coupling relationship between a filtered water integration member and a plate-shaped filter member in a gravity-type water-purifying device according to an embodiment of the present invention.

To this end, the filtered water integration member 120 may include a body 121, a plurality of protrusions 123, a fastening member 125, a plurality of inlets 126 and at least one outlet 127, as shown in FIGS. 12 to 14, and the plurality of inlets 126 may be connected one-to-one with the receiving ports 117 provided in each of the plate-shaped filter members 110 via a tube 130.

Specifically, the body 121 may include an integration space or interior manifold volume 122 formed therein to integrate the filtered water incoming from each of the plate-shaped filter members 110 through the inlet 126 connected to the tube 130, and a plurality of inlets 126 connected to the tube 130 may be formed on one side of the body 121. In addition, at least one outlet 127 for discharging the filtered water integrated in the integration space 122 to the outside may be formed on one side of the body 121.

Accordingly, the filtered water produced individually from each of the plate-shaped filter members 110 may be moved to the integration space 122 through the receiving port 117, the tube 130 and the inlet 126, and the filtered water introduced into the integration space 122 may be discharged to the outside through the outlet 127.

In this case, the plurality of protrusions 123 may be formed to protrude at a certain height from one surface of the body 121, and may be disposed to be spaced apart from each other at a predetermined interval.

Accordingly, a accommodation groove 124 into which one side of the plate-shaped filter member 110 is inserted may be formed between two adjacent protrusions 123.

Herein, the plate-shaped filter member 110 may include a coupler 111a formed on one side of the support frame 111 to protrude outward by a certain length, and the coupler 111a may be inserted into the accommodation groove 124.

Accordingly, when the coupler 111a provided in each of the plurality of plate-shaped filter members 110 are respectively inserted into the plurality of accommodation grooves 124 formed on one side of the body 121, the plurality of plate-shaped filter members 110 may be arranged along one direction so that each one surface thereof faces each other, and be maintained in a state spaced apart from each other by the thickness of the protrusions 123.

As a result, both surfaces of each of the plate-shaped filter members 110 may be in smooth contact with the raw water.

As described above, the filtered water integration member 120 may perform all of a function of integrating the filtered water produced individually through each of the plate-shaped filter members 110 into one, a function of maintaining a spaced distance between two plate-shaped filter members 110 spaced apart in parallel with each other, and a function of fixing each of the plurality of plate-shaped filter members 110.

Herein, the filtered water integration member 120 may include at least one fastening member 125 that is detachably coupled to the body 121, and the at least one fastening member 125 may prevent the plate-shaped filter members 110 respectively inserted into the plurality of accommodation grooves 124 from being separated from the accommodation grooves 124.

For example, the fastening member 125 may be a fastening bar having a predetermined length, and the fastening bar may be fastened to the body 121 to pass through all of the plurality of protrusions 123.

In this case, a fastening hole 128 may be formed through the plurality of protrusions 123 to allow the fastening member 125 to pass therethrough, and a through-hole 119 may be formed through the coupler 111a at a position corresponding to the fastening hole 128.

Accordingly, when the fastening bar is fastened to the body 121 to pass through the fastening hole 128 provided in each of the plate-shaped filter member 110 and the through-hole 119 formed in each of the plurality of protrusions 123 in a state in which the coupler 111a provided in each of the plate-shaped filter members 110 is inserted into the accommodation groove 124, each of the plate-shaped filter members 110 may be fixed to the body 121 in a state in which the coupler 111a is inserted into the accommodation groove 124.

Through this, the plate-shaped filter members 110 respectively inserted into the plurality of accommodation grooves 124 may be prevented from being separated from the accommodation groove 124 by the fastening bar.

Accordingly, the total number of use of the plate-shaped filter member 110 fixed to the body 121 in the filter module 100 may be easily adjusted according to the production of filtered water required per hour.

In addition, each of the plate-shaped filter members 110 in the filter module 100 may be detachably coupled to the body 121, whereby only the plate-shaped filter members requiring replacement among the plurality of plate-shaped filter members 110 may be individually replaced.

Accordingly, the gravity-type water-purifying device 1000 according to an embodiment of the present invention may improve convenience of use and reduce maintenance costs.

That is, since the plurality of plate-shaped filter members 110 and the filtered water integration member 120 in the filter module 100 may be configured as individual modules that may be detached from each other, some destroyed or damaged parts may be individually replaced. Accordingly, the gravity-type water-purifying device 1000 according to an embodiment of the present invention may reduce maintenance costs.

Although an embodiment of the present invention have been described above, the spirit of the present invention is not limited to the embodiment presented in the subject specification; and those skilled in the art who understands the spirit of the present invention will be able to easily suggest other embodiments through addition, changes, elimination, and the like of elements without departing from the scope of the same spirit, and such other embodiments will also fall within the scope of the present invention.

The invention claimed is:

1. A gravity-flow water purifying device comprising:
   a housing (200) defining an interior volume (210), the housing (200) having a housing outlet (220) at a bottom of the housing (200);
   a filter module (100) disposed within the interior volume (210), including:
      a plurality of filter plates (110), each plate defining an interior empty space for receiving filtrate;
      a manifold (120) defining an interior manifold volume (122), the manifold (120) having a plurality of inlets (126) in fluid communication with the interior manifold volume (122), wherein each inlet (126) of the plurality of inlets (126) is in fluid communication with the interior empty space of a respective filter plate (110), the manifold (120) having at least one outlet (127) in fluid communication with the housing outlet (220), a top of the manifold (120) having a plurality of parallel accommodation grooves (124) each sized and shaped to receive and support a filter plate (110); and
   a movable storage vessel (1210) disposed below the housing (200), the movable storage vessel (1210) having an inlet opening in fluid communication with the at least one outlet (127) for receiving filtered water.

2. The gravity-flow water purifying device of claim 1, wherein the movable storage vessel (1210) is box-shaped and includes a fitting (1220) formed in the movable storage vessel so as to be detachably coupled to an end of a connection pipe (1300).

3. The gravity-flow water purifying device of claim 1, wherein an additional filter (1400) is disposed in a connection pipe (1300) fluidically disposed between the at least one outlet (127) and the inlet of the movable storage vessel for further filtering water exiting the housing (200).

4. The gravity-flow water purifying device of claim 3, wherein the connection pipe (1300) includes a valve (1500) for controlling flow therethrough.

5. The gravity-flow water purifying device of claim 1, wherein each of the plurality of filter plates (110) includes:
   a support frame (111) comprising a loop-shaped edge member (112) defining the empty space which is open on both sides, and a partition member (114) coupled to the loop-shaped edge member (112) to partition the empty space into a plurality of storage spaces (115);
   a pair of filtration members (118) shaped to conform with the shape of the support frame (111), having a predetermined area and being coupled to both surfaces of the support frame (111) to produce filtered water or filtrate from unfiltered water moving from the outside of each filter plate (110) to the plurality of storage spaces (115);
   at least one communication path (116) formed in the partition member (114) to allow the plurality of storage spaces (115) to be in fluid communication with each other; and
   a receiving port (117) provided on one side of the support frame (111) and in fluid communication with the plurality of storage spaces (115) and in fluid communication with the interior manifold volume (122) of the manifold (120) via a tube (130) configured to deliver filtered water from the storage spaces (115) to the interior manifold volume (122).

6. The gravity-flow water purifying device of claim 5, wherein the communication path (116) is at least one recessed portion in the partition member (114).

7. The gravity-flow water purifying device of claim 5, wherein the communication path (116) is at least one through-hole in the partition member (114).

8. The gravity-flow water purifying device of claim 5, wherein the edge member (112) includes a stepped portion (113) formed along the inner side of the edge, and an edge side of the filtration member (118) is fixed to the stepped portion (113).

9. The gravity-flow water purifying device of claim 5, wherein the partition member (114) includes at least one lateral member (114*a*) having a predetermined length and at least one longitudinal member (114*b*) disposed to intersect the lateral member.

10. The gravity-flow water purifying device of claim 5, wherein the filtration member (118) includes a plate-shaped support (118*a*) having a predetermined area, and a nanofiber web layer (119*b*) formed of nanofiber and disposed on one surface or both surfaces of the plate-shaped support (118*a*).

11. The gravity-flow water purifying device of claim 5, wherein all of the plurality of filter plates (110) comprising filter members made of the same filtration material.

12. The gravity-flow water purifying device of claim 1, further comprising:
    at least one fastening member (125) removably extending through the structure defining the plurality of parallel accommodation grooves (124) and through a coupler (111*a*) protruding from each filter plate frame (111), to couple the filter plates (110) to the manifold (120), wherein each coupler (111*a*) extends into a respective parallel accommodation groove (124).

13. The gravity-flow water purifying device of claim 12, wherein the at least one fastening member (125) is a bar or bolt.

\* \* \* \* \*